(12) United States Patent
Herman et al.

(10) Patent No.: US 11,479,372 B2
(45) Date of Patent: Oct. 25, 2022

(54) SATELLITE CONSTELLATIONS

(71) Applicant: Space Exploration Technologies Corp., Hawthorne, CA (US)

(72) Inventors: Jonathan F. C. Herman, Los Angeles, CA (US); Stephen Mance, Hawthorne, CA (US); Paul A. Forquera, Santa Monica, CA (US); Mark Krebs, Hawthorne, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 148 days.

(21) Appl. No.: 17/102,324

(22) Filed: Nov. 23, 2020

(65) Prior Publication Data

US 2021/0070477 A1    Mar. 11, 2021

Related U.S. Application Data

(63) Continuation of application No. 15/908,592, filed on Feb. 28, 2018, now Pat. No. 10,843,822.

(60) Provisional application No. 62/465,110, filed on Feb. 28, 2017, provisional application No. 62/465,064, filed on Feb. 28, 2017.

(51) Int. Cl.
*B64G 1/10* (2006.01)
*B64G 3/00* (2006.01)

(52) U.S. Cl.
CPC ............. *B64G 1/1085* (2013.01); *B64G 3/00* (2013.01)

(58) Field of Classification Search
CPC ................................ B64G 1/1085; B64G 3/00
See application file for complete search history.

(56) References Cited

U.S. PATENT DOCUMENTS

| | | | |
|---|---|---|---|
| 9,391,702 B2 | 7/2016 | Wyler | |
| 9,647,749 B2 * | 5/2017 | Krebs | ...................... H04B 7/19 |
| 9,780,878 B2 | 10/2017 | Sackman et al. | |
| 9,859,927 B2 * | 1/2018 | Lindsay | ................. H04B 7/195 |
| 9,932,131 B2 | 4/2018 | McVicker et al. | |
| 9,973,267 B2 | 5/2018 | Krebs | |
| 10,215,850 B2 * | 2/2019 | Robinson | .............. G01S 11/026 |
| 2014/0341586 A1 | 11/2014 | Wyler | |

(Continued)

FOREIGN PATENT DOCUMENTS

| | | | | |
|---|---|---|---|---|
| CN | 110149140 A | * | 8/2019 | ......... H04B 7/18513 |
| CN | 110417453 A | * | 11/2019 | ......... H04B 7/18519 |
| WO | 2017098334 A2 | | 6/2017 | |

*Primary Examiner* — Brian M O'Hara
(74) *Attorney, Agent, or Firm* — Polsinelli PC

(57) ABSTRACT

A method of communication with a non-GEO constellation of satellites, includes providing an Earth-based terminal configured for communication with a satellite constellation, and establishing communication between the Earth-based terminal and a non-GEO constellation of satellites, the non-GEO constellation of satellites including a first plurality of satellites orbiting at a first inclination, wherein each of the satellites in the first plurality of satellites is in a discrete planar orbit to form a first snake of satellites, the first snake of satellites including adjacent satellites in adjacent orbits having adjacent RAAN (Right Ascension of the Ascending Node), wherein the Earth-based terminal is positioned and configured for continuous communication with at least one satellite from the non-GEO constellation of satellites.

18 Claims, 16 Drawing Sheets

(56) References Cited

U.S. PATENT DOCUMENTS

2017/0126307 A1    5/2017  Wyler
2018/0186477 A1*   7/2018  Sainct .................... B64G 1/242

* cited by examiner

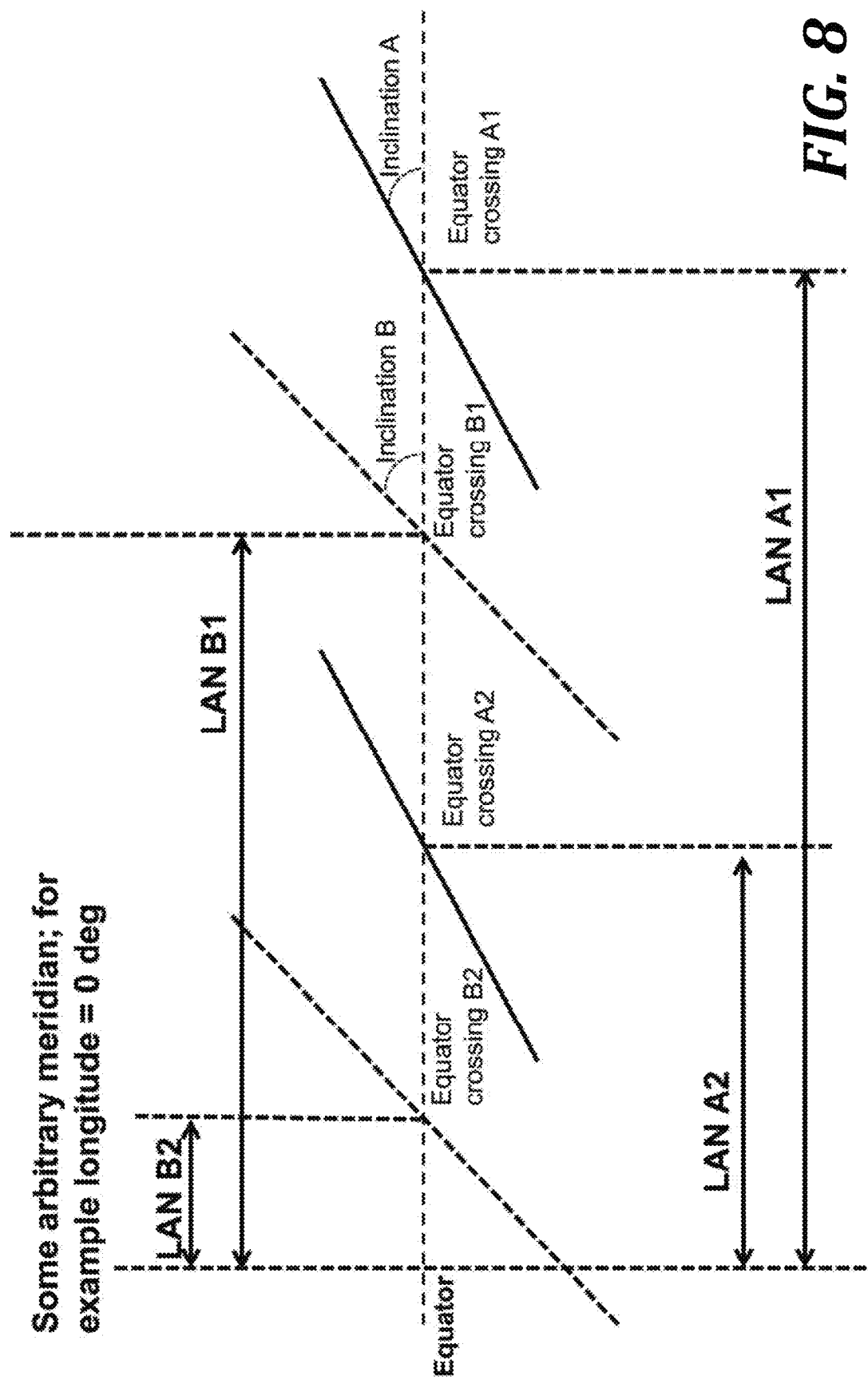

SATELLITE CONSTELLATIONS

CROSS-REFERENCES TO RELATED APPLICATIONS

This application is a continuation of U.S. application Ser. No. 15/908,592, filed Feb. 28, 2018, which claims the benefit of U.S. Provisional Patent Application Nos. 62/465,110 and 62/465,064, both filed Feb. 28, 2017, the disclosures of which are hereby expressly incorporated by reference herein in their entirety.

BACKGROUND

Communication satellites receive and transmit radio signals from and to the surface of Earth for the purpose of providing communication services. In conventional satellite technology, only a few locations on Earth were in view of a satellite at any given time to transmit and/or receive signals to and/or from a satellite. In more modern satellite technology, it is desirable for every place on Earth be provided communication services at all times, a capability which may be referred to as universal or global coverage. In addition to global coverage, some locations on Earth, such as densely populated areas, require more communication capacity than others.

For global coverage, communication systems may employ non-geostationary satellites. Geostationary satellites orbit the equator with an orbital period of exactly one day (flying at an altitude of approximately 35,786 km above mean sea level). Therefore, geostationary satellites remain in the same area of the sky as viewed from a specific location on Earth. In contrast, non-geostationary satellites typically operate in low- or mid-Earth orbit and do not remain stationary relative to a specific location on Earth.

Satellite constellations are needed with improved global coverage and improved communication capacity. Embodiments of the present disclosure are directed to fulfilling these need and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment of the present disclosure, a constellation of satellites is provided. The constellation of satellites includes a first plurality of satellites orbiting at a first inclination, wherein each of the satellites in the first plurality of satellites is in a discrete planar orbit to form a first snake of satellites, the first snake of satellites including adjacent satellites in adjacent orbits having adjacent RAAN (Right Ascension of the Ascending Node).

In another embodiment of the present disclosure, a constellation of satellites is provided. The constellation of satellites includes: a first plurality of satellites orbiting at a first inclination, wherein each of the satellites in the first plurality of satellites is in a discrete planar orbit to form a first snake of satellites, the first snake of satellites including adjacent satellites in adjacent orbits having adjacent RAAN (Right Ascension of the Ascending Node), wherein the stagger between satellites in the first snake of satellites is substantially constant; and a second plurality of satellites orbiting at a second inclination, wherein the second inclination is different from the first inclination, wherein each of the satellites in the second plurality of satellites is in a different planar orbit to form a second snake of satellites, the second snake of satellites including adjacent satellites in adjacent orbits having adjacent RAAN, wherein the stagger between satellites in the second snake of satellites is substantially constant.

In another embodiment of the present disclosure, a method of communication with a non-GEO constellation of satellites is provided. The method includes: providing an Earth-based terminal configured for communication with a satellite constellation; and establishing communication between the Earth-based terminal and a non-GEO constellation of satellites, the non-GEO constellation of satellites including a first plurality of satellites orbiting at a first inclination, wherein each of the satellites in the first plurality of satellites is in a discrete planar orbit to form a first snake of satellites, the first snake of satellites including adjacent satellites in adjacent orbits having adjacent RAAN (Right Ascension of the Ascending Node), wherein the Earth-based terminal is positioned and configured for continuous communication with at least one satellite from the non-GEO constellation of satellites.

In another embodiment of the present disclosure, a method of communication with a non-GEO constellation of satellites is provided. The method includes: providing an Earth-based terminal configured for communication with a satellite constellation; and establishing communication between the Earth-based terminal and a first plurality of satellites orbiting at a first inclination, wherein each of the satellites in the first plurality of satellites is in a discrete planar orbit to form a first snake of satellites, the first snake of satellites including adjacent satellites in adjacent orbits having adjacent RAAN (Right Ascension of the Ascending Node), wherein the stagger between satellites in the first snake of satellites is substantially constant, and establishing communication between the Earth-based terminal and a second plurality of satellites orbiting at a second inclination, wherein the second inclination is different from the first inclination, wherein each of the satellites in the second plurality of satellites is in a different planar orbit to form a second snake of satellites, the second snake of satellites including adjacent satellites in adjacent orbits having adjacent RAAN, wherein the stagger between satellites in the second snake of satellites is substantially constant.

In any of the embodiments described herein, by selective placement of adjacent satellites in relative argument of latitude and RAAN, the virtual ascending node of the constellation snake may have a controllable regression rate.

In any of the embodiments described herein, the stagger between satellites in the first snake of satellites may be substantially constant.

In any of the embodiments described herein, the snake may define a plurality of loops forming a continuous path.

In any of the embodiments described herein, the constellation of satellites may further include a second plurality of satellites orbiting at a second inclination, wherein the second inclination is different from the first inclination, wherein each of the satellites in the second plurality of satellites is in a different planar orbit to form a second snake of satellites, the second snake of satellites including adjacent satellites in adjacent orbits having adjacent RAAN.

In any of the embodiments described herein, the stagger between satellites in the second snake of satellites may be substantially constant.

In any of the embodiments described herein, the first and second snakes may have a synchronized virtual RAAN rate such that their ascending nodes maintain constant spacing.

In any of the embodiments described herein, the first and second snakes may provide fixed and interleaved ground coverage at the equator.

In any of the embodiments described herein, the first and second snakes may provide fixed and overlapping ground coverage at the equator.

In any of the embodiments described herein, the first inclination may be in a range selected from the group consisting of between 30 degrees and 60 degrees and between 40 degrees and 55 degrees.

In any of the embodiments described herein, the second inclination may be in a range selected from the group consisting of between 30 degrees and 60 degrees and between 40 degrees and 55 degrees.

In any of the embodiments described herein, the first snake may be a first repeating ground track.

In any of the embodiments described herein, the second snake may be a second repeating ground track.

In any of the embodiments described herein, the first snake may be a first drifting ground track.

In any of the embodiments described herein, the second snake may be a second drifting ground track.

In any of the embodiments described herein, the satellites in the first plurality of satellites may be located at an altitude range in space selected from the group consisting of between 200 km and 400 km, between 300 km and 400 km, and between 330 km and 350 km from Earth.

In any of the embodiments described herein, the satellites in the second plurality of satellites may be located at an altitude range in space selected from the group consisting of between 200 km and 400 km, between 300 km and 400 km, and between 330 km and 350 km from Earth.

In any of the embodiments described herein, the satellites in the first snake and the satellites in the second snake may be within an altitude of each other in a range of less than or equal to 200 km.

In any of the embodiments described herein, the satellite constellation may further include a third plurality of satellites traveling at a third inclination, wherein the third inclination is different from the first and second inclinations, wherein each of the satellites in the third plurality of satellites is in a different planar orbit to form a third snake of satellites, the third snake of satellites including adjacent satellites in adjacent orbits having adjacent RAAN.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 8 is a close-up schematic view of equator crossings by individual satellites in satellite strings showing longitude of ascending node (LAN) values in accordance with embodiments of the present disclosure are provided.

DETAILED DESCRIPTION

Figure 1A:
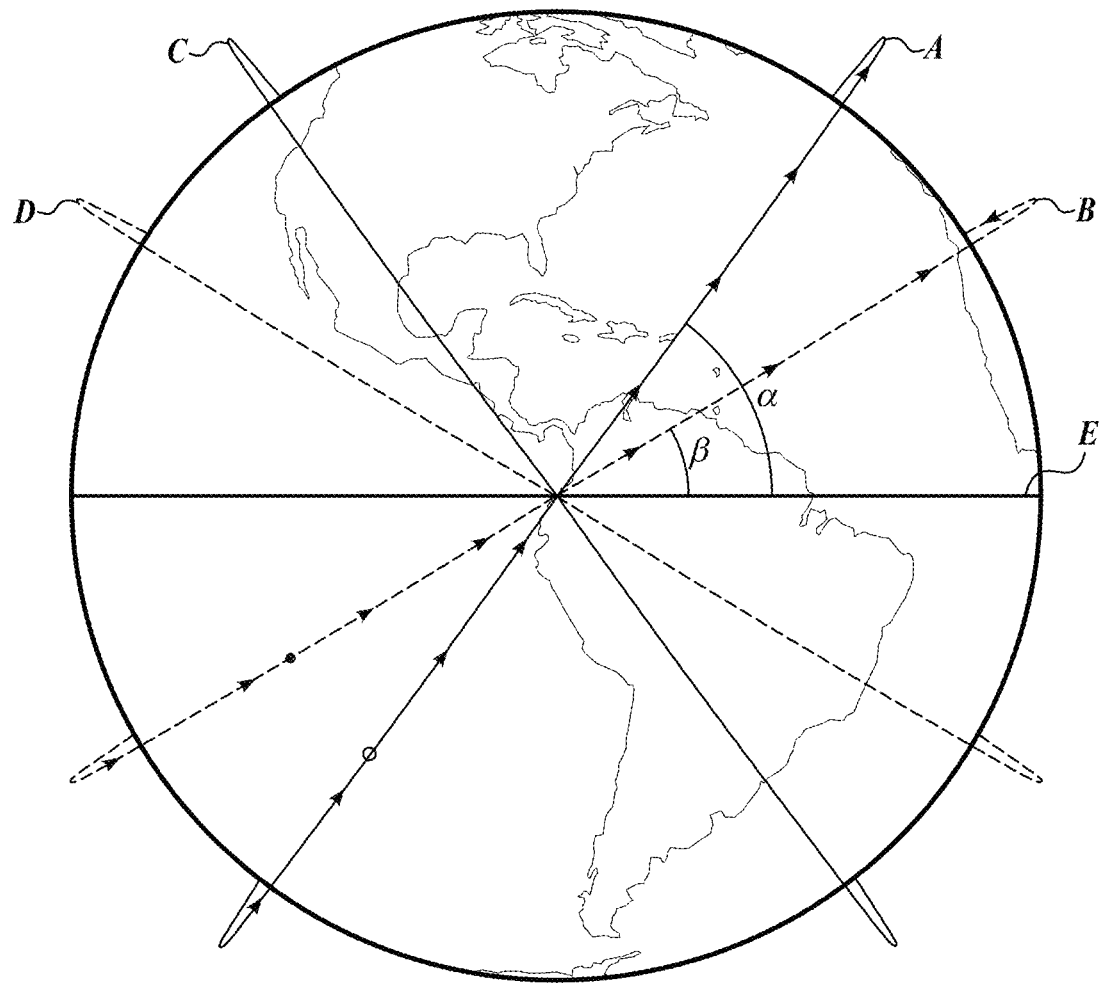
FIGS. 1A and 1B are schematics of first and second satellite systems having different inclinations and similar altitudes resulting in drifting orbital planes in accordance with previously developed satellite constellation technology.

Embodiments of the present disclosure are directed to constellations of satellites having synchronized ground tracks, in contrast to traditional satellite constellations of "synchronized planes" with strings of satellites following each other in the same orbital planes. In accordance with one embodiment of the present disclosure, strings of satellites having synchronized ground tracks orbit the Earth in "wave" configurations, with each satellite in the string of satellites having a discrete orbital plane. "Wave" configurations may also be referred to herein as "snake", "string", or "ground track" configurations.

For the purposes of global satellite coverage applications, for example, for global internet coverage, a large number of satellites are needed defining a predictable grid of satellite coverage. If there are not enough satellites in a predictable grid, frequent service outages may occur. The design of the constellation of satellites to meet the needs of the communication application is a function of desired satellite altitude and inclination pairing, antenna characteristics, and whether the ground tracks are repeating or non-repeating ground tracks, all described in greater detail below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

Unsynchronized (Drifting) Orbital Planes

Referring to FIG. 1A, a constellation of satellites in accordance with previously developed technology is provided. The constellation shows four satellite orbits in four different orbital planes, including satellites strings A, B, C, and D. For simplification in the illustrated embodiment, the satellite strings include one satellite. However, in accordance with embodiments of the present disclosure, each satellite string includes a plurality of satellites following each other in the path of the orbital plane.

Satellite strings A, B, C, D are at similar altitudes, but at different inclinations, inclinations angle A and inclination angle B. For example, string A is at an inclination $\alpha$ of about 55 degrees relative to the equator E and string B is at an inclination $\beta$ of about 32 degrees relative to the equator E. Satellite strings C and D mirror satellite strings A and B.

The altitudes of the satellite strings are not exactly the same to avoid collision of satellites in different systems, but they are within close range of each other, such that altitude is a minimal factor in the different operating characteristics of the first and second satellite strings A and B. For example, satellite string A and satellite string B may be in an altitude range of a few kilometers, less than 200 km.

Figure 1B:
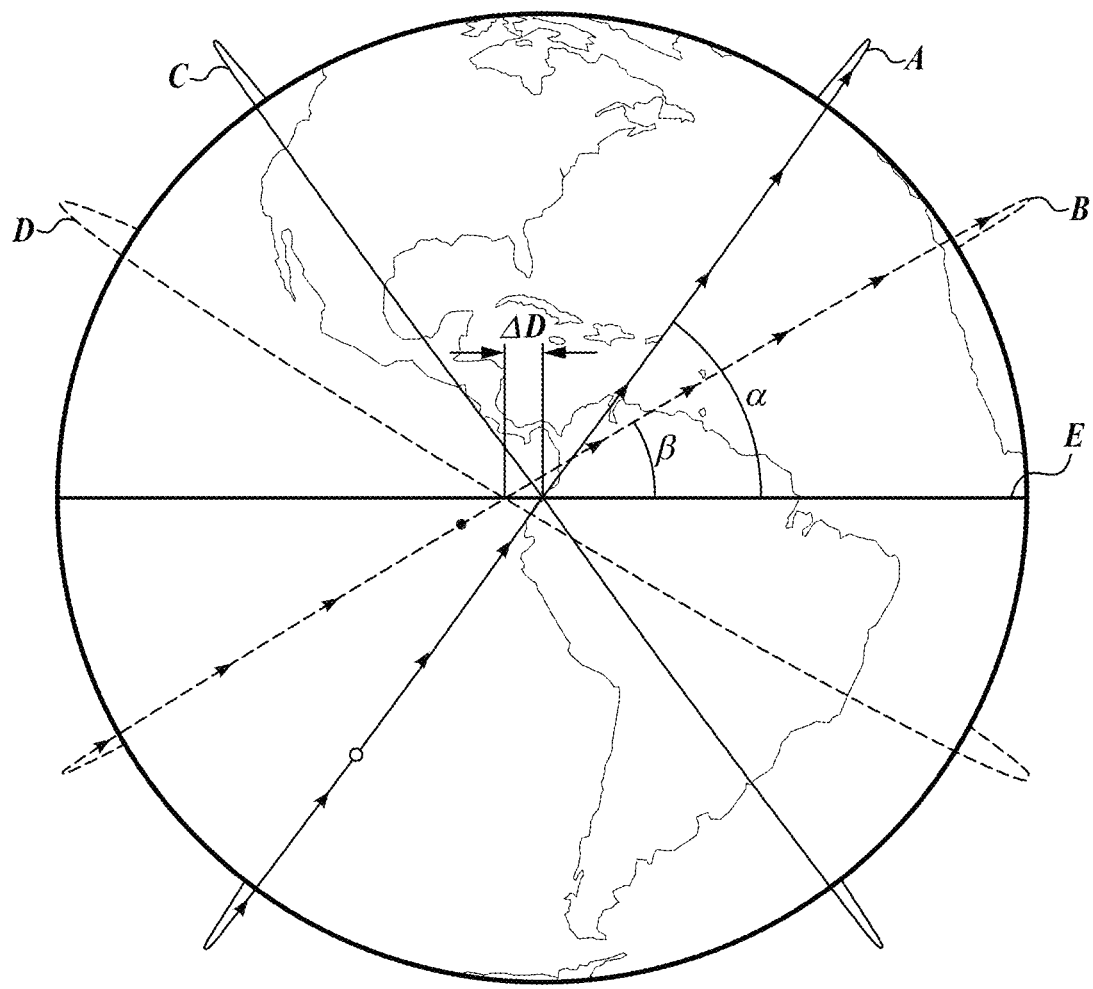

Referring to FIG. 1B, the two satellite strings A and B of FIG. 1A have different westward drift rates in view of their different inclinations A and B. Therefore, after a period of time, the second string of satellites B has drifted more westward than the first string of satellites A, as shown by drift differential $\Delta D$. The drift differential $\Delta D$ between the first and second satellite strings A and B is undesirable because it adds uncertainty to the meshing between the two areas of coverage by the two satellite strings A and B. Meshing or interleaving between satellite strings is desirable in communication systems that depend on a known satellite constellation for predictable satellite coverage.

As described in greater detail below, the meshing or interleaving between satellite strings may have a fixed drift between the satellite strings (which is called a "synchronized ground track") or the meshing between satellite strings may have no drift relative to the rotation of the Earth (which is called a "synchronized repeating ground track" because the strings of satellites always follow the same ground track on the Earth with each rotation around the Earth). As described in greater detail below, embodiments of the present disclosure are directed to satellite constellations having synchronized ground tracks or satellite constellations having synchronized repeating ground tracks.

The satellite constellations of the present disclosure are in non-geostationary orbits. A satellite in a geostationary orbit is at an altitude of approximately 35,786 km above mean sea level. Satellite constellations of the present disclosure are at lower altitudes. In one embodiment of the present disclosure, the satellite constellation of the present disclosure is at an altitude of less than 10,000 km. In another embodiment, the satellite constellation of the present disclosure is in a low Earth orbit at an altitude of less than 2000 km. In another embodiment, the satellite constellation of the present disclosure is in a very low Earth orbit at an altitude of less than 500 km.

Synchronized (Fixed Drift) Orbital Planes

Figure 2A:
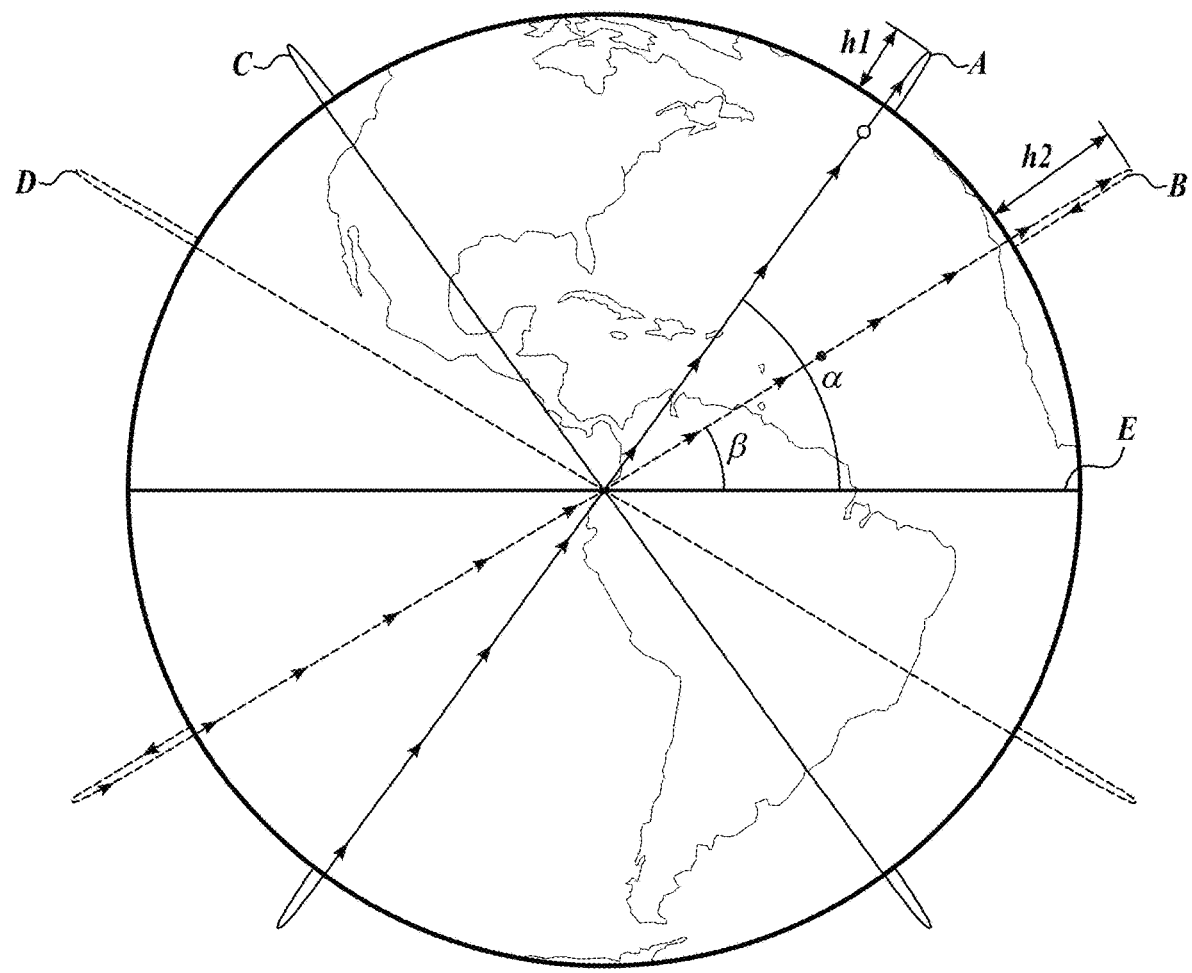
FIG. 2A is a schematic of first and second satellite systems having different inclinations and different altitudes resulting in non-drifting orbital planes in accordance with previously developed satellite constellation technology.

Referring to FIG. 2A, one solution for reducing the difference in drift rate between two satellite systems in accordance with previously developed technology is to fly the two satellite systems at two different altitudes. See altitude h1 for satellite string A and altitude h2 for satellite string B. The altitude difference between the two satellite systems A and B can be fixed such that the precession of the right ascension of the ascending node (RAAN) is identical for the satellites in either satellite orbital plane.

Figure 2B:
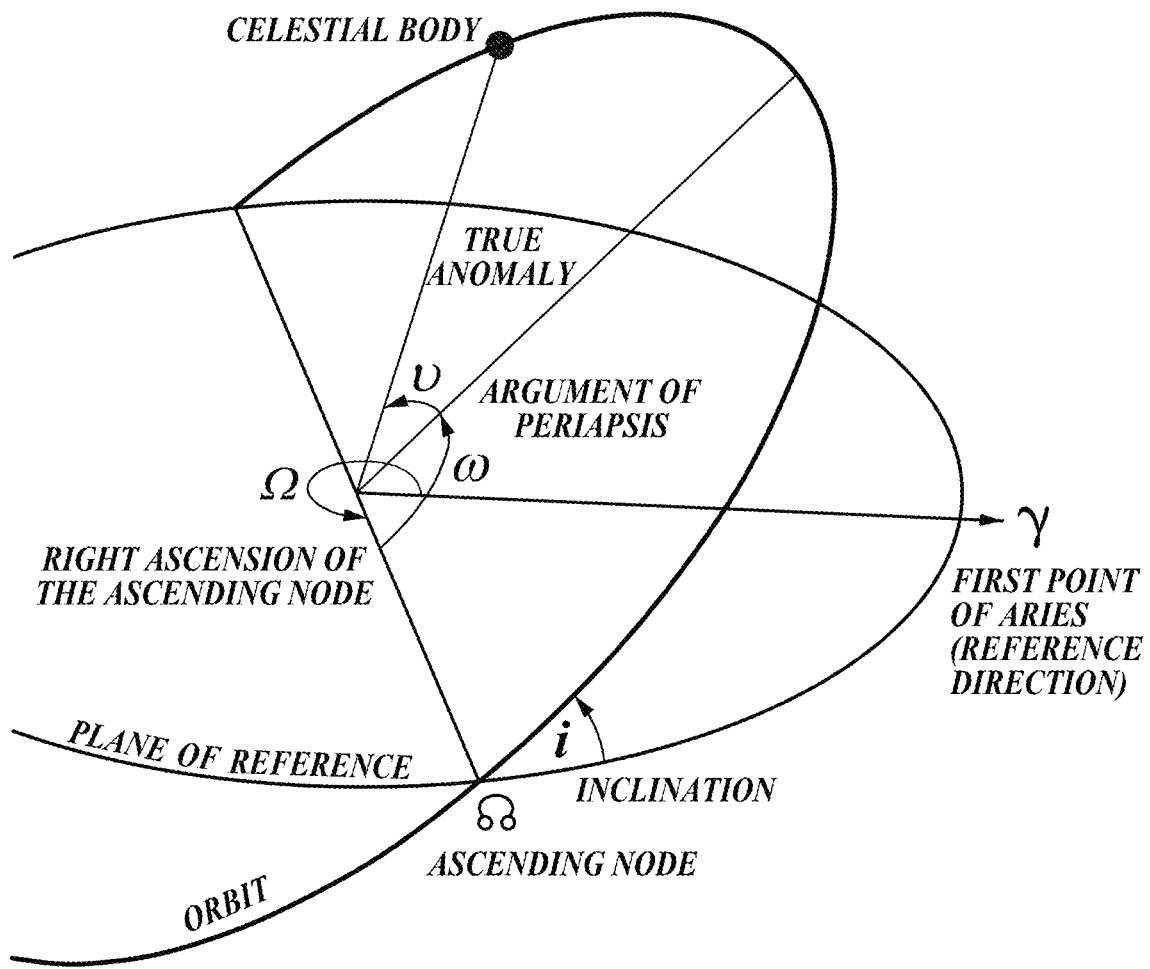
FIG. 2B is a schematic describing the ascending node of an orbiting body in accordance with embodiments of the present disclosure.

Referring to FIG. 2B, for a geocentric orbit of an object orbiting Earth, Earth's equatorial plane E is the reference plane and the First Point of Aries $\gamma$ (which is considered to be the celestial "Prime Meridian") is the origin of longitude. In an inertial frame with the Earth rotating, the longitude of the orbit is wherein the orbit crosses the plane of reference measured from the reference direction γ, measured eastwards (or, as seen from the north, counterclockwise) from the First Point of Aries γ to the ascending node Ω, and is called the right ascension of the ascending node (RAAN). Two numbers orient the orbital plane in space: inclination and RAAN.

As described in greater detail below with reference to FIG. 8, the longitude of the ascending node (LAN) is measured relative to the Prime Meridian (Greenwich Line), in the geographic coordinate system at which longitude is defined to be 0° dividing the Earth into the Eastern Hemisphere and the Western Hemisphere (in contrast to RAAN, which is measured relative to a celestial plane of reference).

Returning for FIG. 2A, string A may, for example, be at an inclination α of about 55 degrees relative to the equator E and an altitude of approximately 1150 km and string B may be at an inclination β of about 32 degrees relative to the equator E and an altitude of approximately 2040 km. Because the precession of the RAAN for the two satellite systems is identical, the systems drift together in a locked drift such that they continue to mesh and be interleaved.

RAAN precession can be calculated using the following equation:

$$\dot{\Omega} = -\frac{3}{2}J_2\left(\frac{Radius_{Earth}}{p_A}\right)^2 n_A \cos i_A = -\frac{3}{2}J_2\left(\frac{Radius_{Earth}}{p_B}\right)^2 n_B \cos i_B$$

$$n = \sqrt{\frac{\mu}{a^3}} \qquad p = a(1-e^2)$$

Wherein $\dot{\Omega}$ is RAAN precession, J2 is Earth's oblateness, [Radius]_Earth is the Earth's mean equatorial radius, i is the orbit inclination, a is the orbit semi-major axis, e is the orbit eccentricity, and μ is the Earth's gravitational parameter.

While a locked drift is desirable for satellite coverage, it may be difficult to acquire government licenses needed to operate two orbital satellite strings in two different altitudes required for a locked drift. In addition, satellites configured to fly at altitudes that are within close altitude range (for example, within an altitude range of less than about 200 km) can be designed with similar (if not the same) design characteristics. Satellites flying at vastly different altitudes present design challenges due to differences in flying conditions.

Figure 3A:
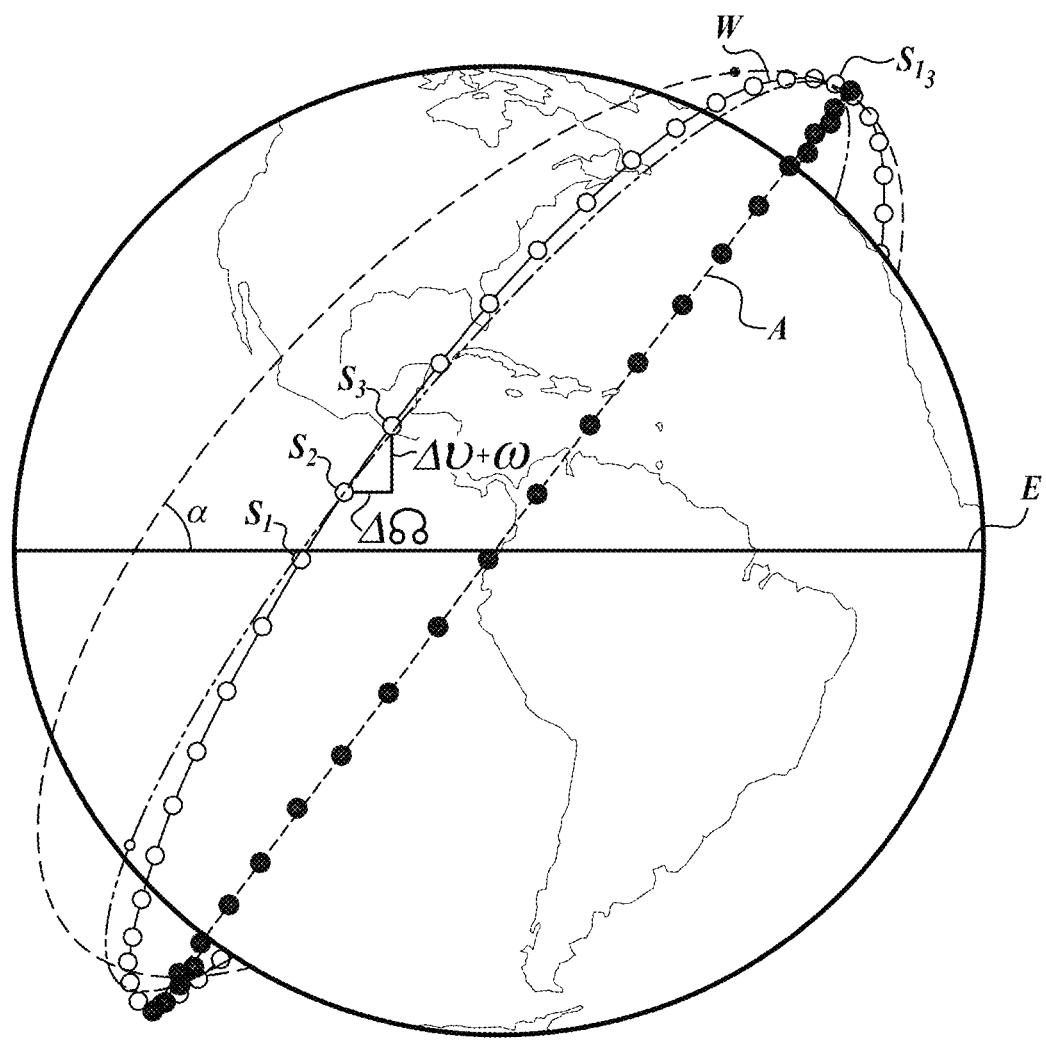
FIG. 3A is a schematic comparing a satellite string in an orbital plane, and a satellite string with each satellite having a discrete orbit, ground-tracking string in accordance with embodiments of the present disclosure.

Strings of Satellites with Each Satellite in Each String Having a Discrete Orbit Referring to FIG. 3A, in accordance with embodiments of the present disclosure, a first satellite string W making a loop is shown having a "wave" formation with each satellite in each string having a discrete orbit. The first satellite string W includes a plurality of satellites S1, S2, S3, etc., following each other in a wave formation, wherein each satellite takes a separate and discrete orbital path around the Earth, as indicated by the dotted orbital paths of two of the satellites S2 and S13 in the satellite string W.

As seen in FIG. 3A, an orbital satellite string A is also shown for comparison.

A loop in a string of satellites is defined by two simultaneous crossings of the equator in the same crossing direction by a specific satellite in the string of satellites. As seen in FIG. 3A, a specific satellite S1 is crossing the equator E at an ascending node (from the southern hemisphere to the northern hemisphere) at a first time at t1. A loop of the string of satellites is completed when satellite S1 crosses the equator again at an ascending node (from the southern hemisphere to the northern hemisphere) at a second time at t2. Of note, on the opposite side of the Earth, the satellite S1 will cross the equator from the opposite crossing direction at a descending node (from the norther hemisphere to the southern hemisphere), which defines a half loop.

Figure 3B:
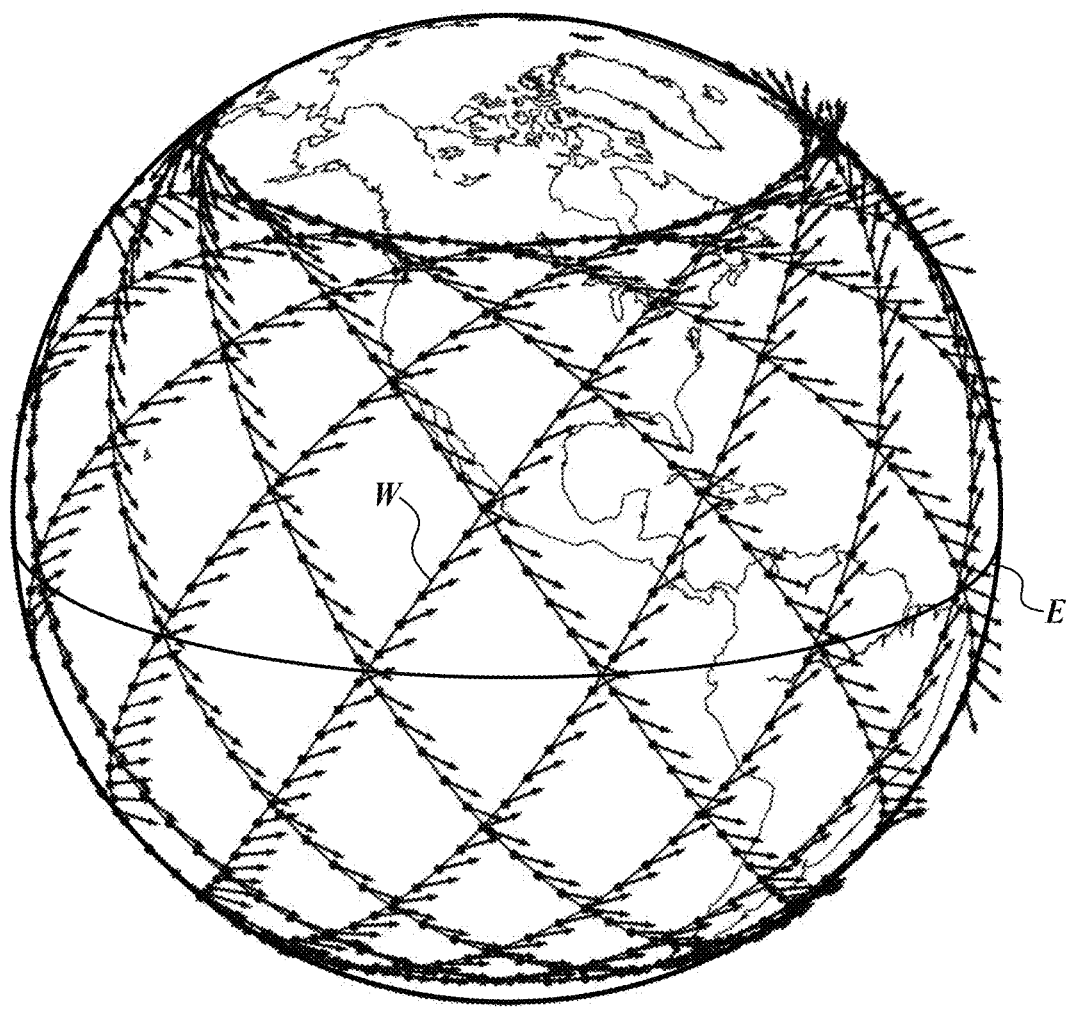
FIG. 3B is a schematic showing a plurality of satellite strings in synchronized ground-tracking strings with each satellite in each string having a discrete orbit and all satellites and strings at the same inclination in accordance with embodiments of the present disclosure.

Referring to FIG. 3B, a satellite string W at the same inclination α as provided in FIG. 3A is shown. In FIG. 3A, the satellite string W travels one loop in an inertial frame. However, in FIG. 3B, in a frame that rotates with the Earth, the satellite string W travels multiple loops to form a continuous path around the Earth. A continuous path is formed when the first satellite in the sting of satellites repeats previous ground track on the earth, thus forming a continuous path with the last satellite in the string of satellites.

As seen in FIG. 3B, each satellite in the satellite string W takes a discrete orbital path around the Earth, as indicated by the arrows extending from each of the satellites in the wave formation showing the inertial velocity of each satellite.

In the illustrated embodiment of FIG. 3B, the satellite string W makes 13 loops around the Earth to form a continuous path. The inclination and number of loops in the satellite string W defining the path of the satellite string W is application specific and is designed based on many factors including the altitude of the satellite string, semi-major axis, eccentricity of the satellite orbits, number of loops, and inclination.

The ground track is shared between satellites in the string W. However, the orbits of the satellites in the string W are not shared. Adjacent satellites in the string are able to follow the same ground track because the Earth rotates a little in the time two adjacent satellites move a certain distance. The satellites in the string are in different orbits, meaning they "start" in different places, but by the time each satellite moves to a certain latitude, the Earth has rotated to put the same point in the way of each satellite. Therefore, the satellites in the string share a ground track and therefore have a synchronized ground track.

The path of the satellite string W can be designed to be a repeating ground or a non-repeating ground track, both of which are within the scope of the present disclosure. In a repeating ground track, the path of the satellite string W is designed to align with the rotation of the Earth, such that after a set number of loops, the path of the satellite string W repeats over the same locations on the Earth.

In a non-repeating ground track, the path of the satellite string W drifts eastward or westward relative to its previous path.

In accordance with embodiments of the present disclosure, the continuous path of the satellite string W may be formed within less than 20 days, less than 15 days, less than 7 days, and less than 2 days. If the satellite string W is configured for a repeating ground track, the continuous path will be aligned with the revolution of the Earth (which is in one day). If the satellite string W is configured for a non-repeating ground track, the continuous path will not be aligned with the revolution of the Earth.

The number of satellites in a satellite string W may vary in accordance with embodiments of the present disclosure. In some embodiments, the satellite string may include more than 10 satellites, more than 20 satellites, and more than 30 satellites. In some embodiments, the satellite string may include 10 to 300 satellites, Referring to FIG. 3C, a plurality of interleaved satellite strings $W_A$ and $W_B$ at two different inclinations is provided.

Figure 3C:
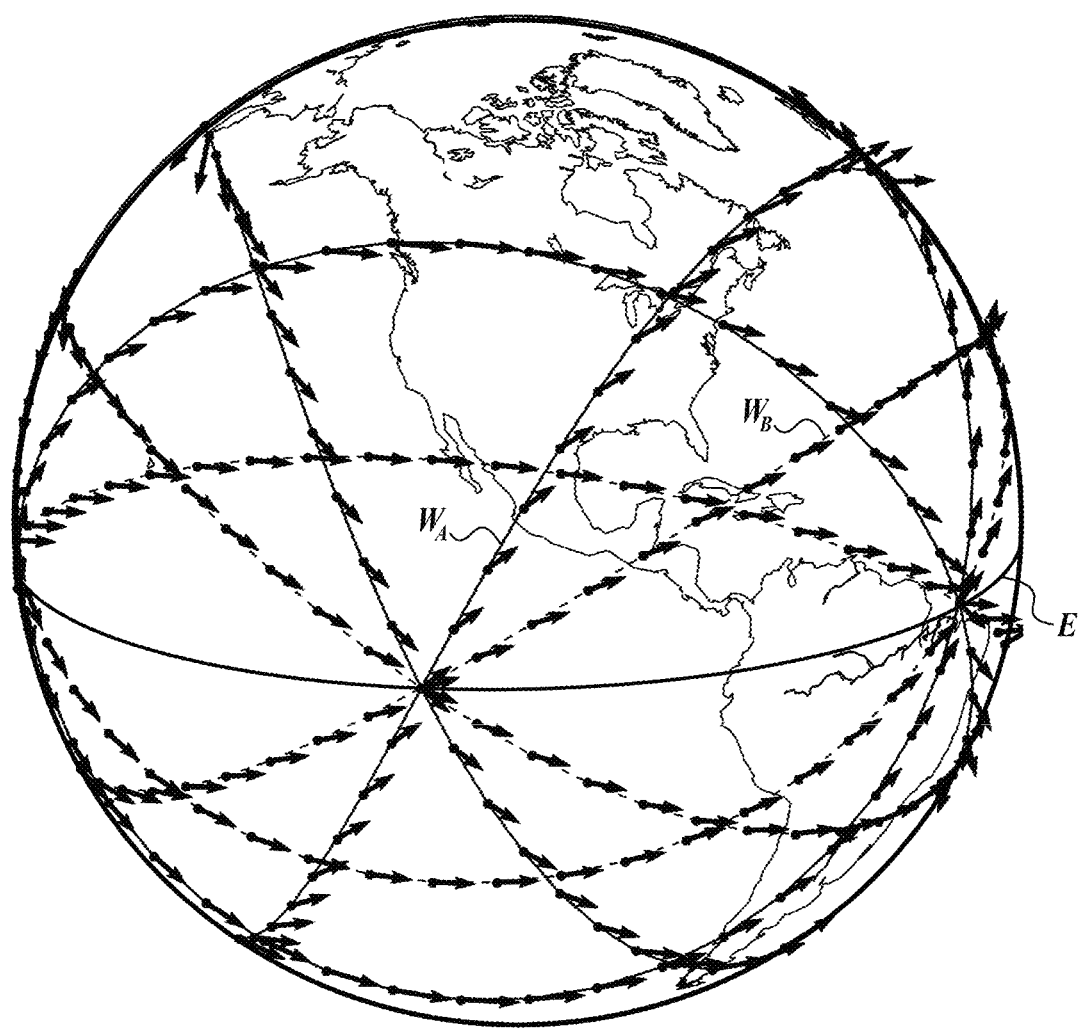
FIG. 3C is a schematic showing a plurality of satellite strings in synchronized ground-tracking strings with each satellite in each string having a discrete orbit and with the strings at two different inclinations in accordance with embodiments of the present disclosure.

($W_A$ is at inclination α and $W_B$ is at inclination β, with neither angle of inclination show in FIG. 3C.) Details of interleaved satellite strings will be discussed in greater detail below. In general, a lower number of satellites can be used in wave satellite strings and interleaved wave satellite strings in accordance with embodiments of the present disclosure to achieve the same or better coverage achieved by orbital satellite strings. Exemplary satellite constellations are provided below in Examples 1-3.

Synchronized (No Drift) Repeating Ground Tracks

Figure 4:
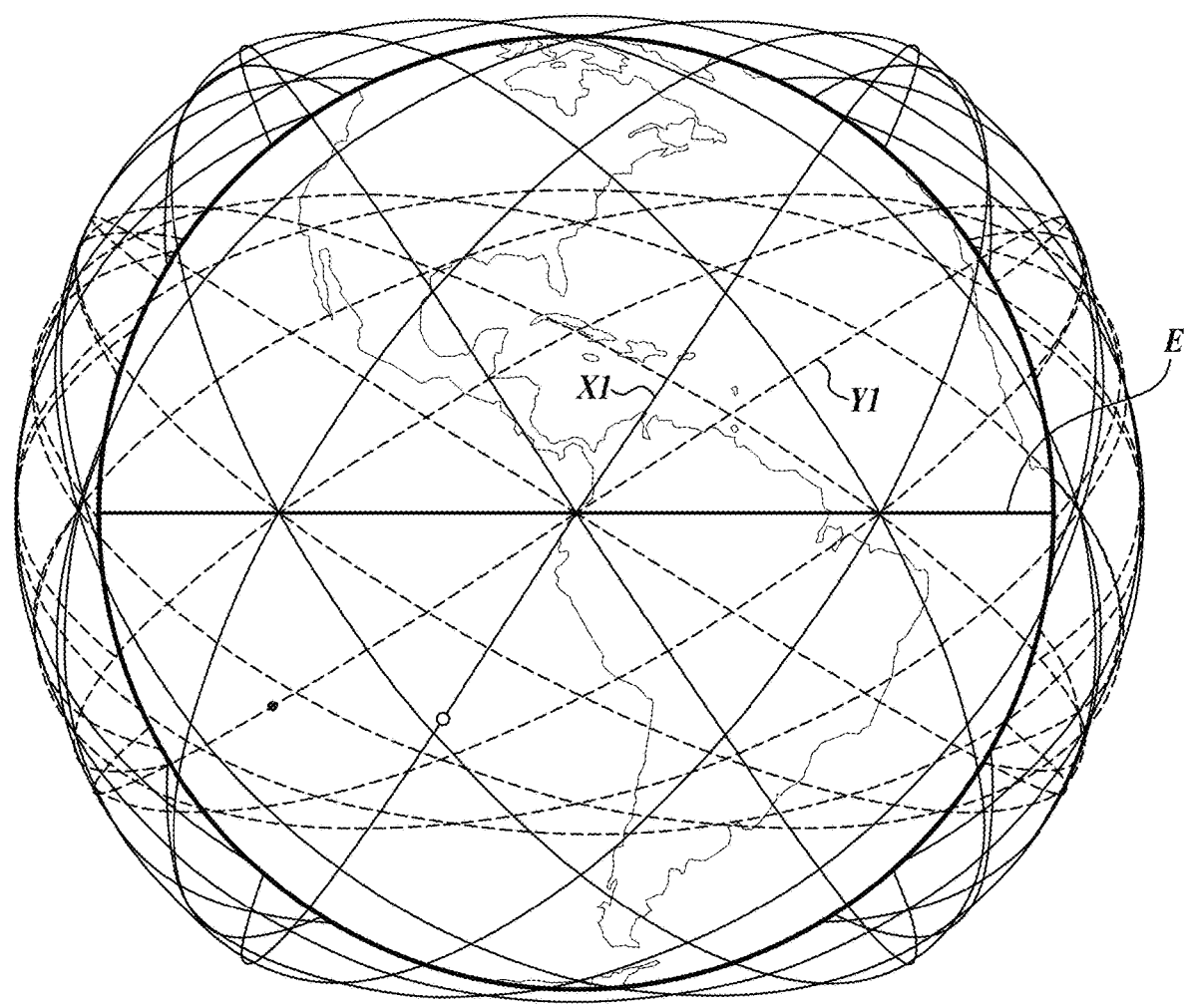
FIG. 4 is a schematic showing a plurality of satellite strings in repeating ground-tracking strings with each satellite in each string having a discrete orbit and with the strings at two different inclinations (no drift) in accordance with embodiments of the present disclosure.

Referring to FIG. 4, in a frame that rotates with the Earth, the satellites in the first and second satellite strings X1 and Y1 are in discrete orbits, each defining a "wave" formation with the two satellite string X and Y having different inclinations. X1 is at inclination α and Y1 is at inclination β, with neither angle of inclination show in FIG. 4.)

In the illustrated embodiment, the first and second satellite strings X1 and Y1 are repeating ground track systems. Therefore, the drift of the first and second satellite strings X1 and Y1 is designed to match the Earth's rotation rate. As a result, the Earth appears to stand still relative to the movement of the satellite strings X1 and Y1, thus giving the appearance of no drift. Each satellite string X1 and Y1 is set up in a "wave" formation (as described with reference to FIG. 3A above) with characteristics such that the wave drifts west at the same rate as the Earth's rotation.

A repeating ground track is achieved by a certain number of loops in the string of satellites based on the characteristics of the wave. In the illustrated embodiment of FIG. 4, both satellite strings X1 and Y1 have similar altitudes close to 1150 km and both satellite strings X1 and Y1 run 13 loops until they repeat their ground track. The ground tracks are therefore fixed, repeating paths on Earth. However, the number of loops cannot be altered to maintain this repeating ground track system of satellites at the same altitude. If a less dense or a more dense grid of satellite coverage is desired by changing the number of loops in the system tracks, the system will drift along the equator, as described in greater detail below with reference to FIG. 5.

In accordance with embodiments of the present disclosure, the first and second satellite strings X1 and Y1 are repeating ground track systems that repeat their ground tracks when the continuous path of the satellite strings X1 and Y1 are completed. Therefore, in some embodiments, the ground tracks may repeat within a time period of less than 20 days, less than 15 days, less than 7 days, and less than 2 days.

The two strings of satellites at different inclinations are synchronized by using the following equations:

$$\omega = \dot{\Omega}_A + \frac{n_A + (\dot{M}_0)_A + (A\dot{o}P)_A}{(k_{revpday})_A} = \dot{\Omega}_B + \frac{n_B + (\dot{M}_0)_B + (A\dot{o}P)_B}{(k_{revpday})_B}$$

$$\dot{M}_0 = \frac{3}{4}J_2\left(\frac{Radius_{Earth}}{p}\right)^2 n\sqrt{1-e^2}\,(2 - 3(\sin i)^2)$$

$$A\dot{o}P = \frac{3}{4}J_2\left(\frac{Radius_{Earth}}{p}\right)^2 n(4 - 5(\sin i)^2) \quad k_{revpday} = \frac{k_{rev2rep}}{k_{day2rep}}$$

Where J2, n, e, i, p, and [Radius]_Earth are defined above, k_rev2rep is the number of equatorial crossings, and k_day2rep is the exact number of nodal days it takes for those crossings to occur.

A nodal day is defined as: $2\pi/(\omega\_E - \dot{\Omega})$, where ω_E is the Earth's rotation rate.

If value of ω is set equal to Earth's rotation rate ω_E, the resulting orbits will be repeat ground track orbits. The value of ω can also be set to other rotation rates besides ω_E.

Some embodiments of the present disclosure are directed to multiple-inclination synchronization of satellite strings over a small altitude range (for example, within an altitude range of about 200 km). The satellite strings may have repeating ground tracks or non-repeating ground tracks.

Synchronized (Fixed Drift) Non-Repeating Ground Tracks

Figure 5:
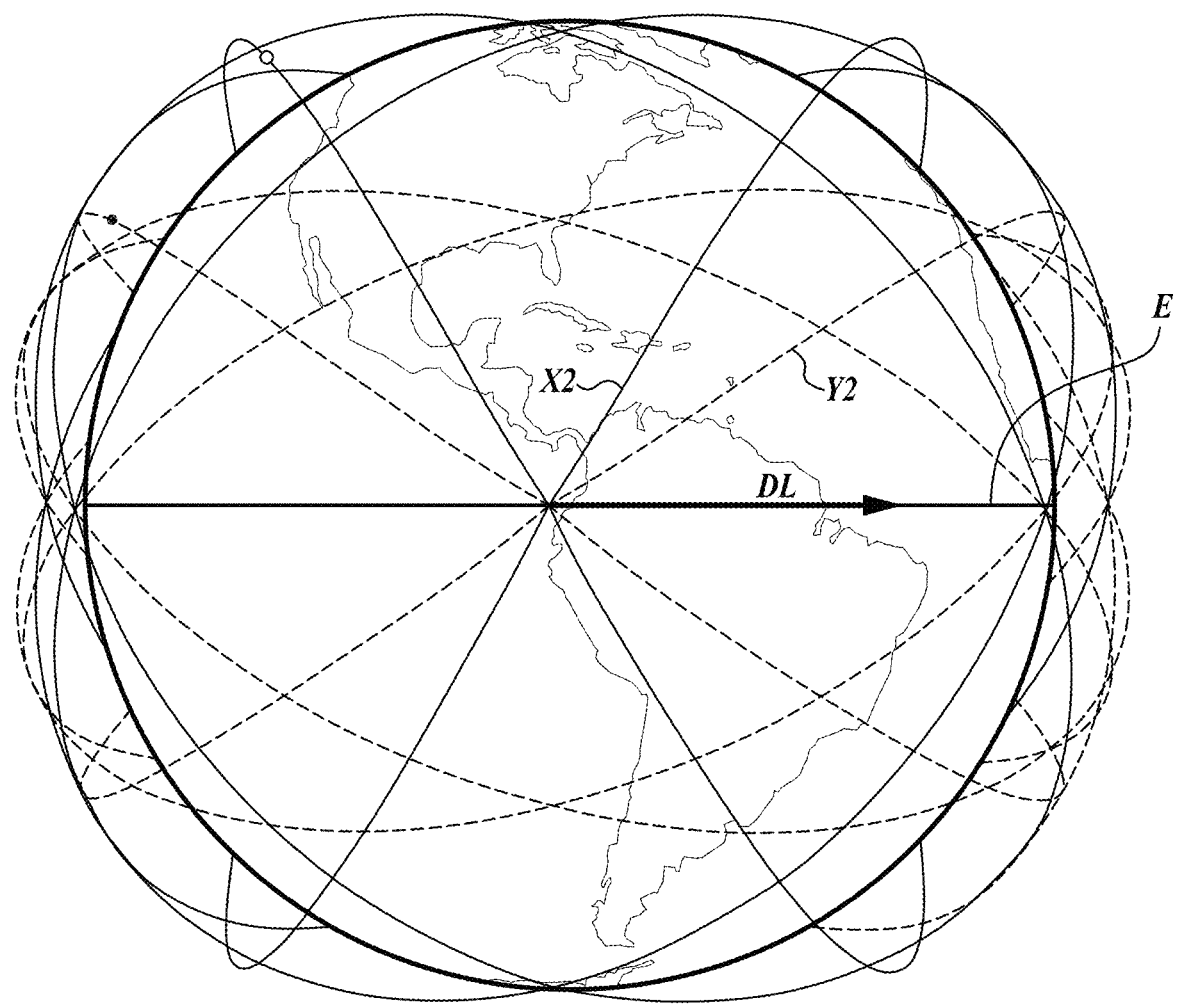
FIG. 5 is a schematic showing a plurality of satellite strings in ground-tracking strings with each satellite in each string having a discrete orbit and with the strings at two different inclinations (fixed drift) in accordance with embodiments of the present disclosure.

Referring to FIG. 5, in a frame that rotates with the Earth, the satellites in the first and second satellite strings X2 and Y2 are in discrete orbits, each defining a "wave" formation and each satellite string X2 and Y2 having a different inclination, similar to the satellite constellation seen above in FIG. 4.

Unlike the strings in FIG. 4 above, the strings X2 and Y2 in FIG. 5 are not designed with the required number of loops to be repeating ground track systems. In contrast, the first and second strings X2 and Y2 drift (with synchronization or drift lock DL) eastward relative to the Earth's rotation rate. Each satellite string is set up in a "wave" formation (as described with reference to FIG. 3A above), and the intersection of the two satellite strings X2 and Y2 drifts (with drift lock DL). In the illustrated embodiment of FIG. 5, the drift DL is shown as a eastward drift, but in other satellite constellations the drift may be westward or eastward depending on the design of the system.

The advantage of such a system shown in FIG. 5 with a non-repeating ground track (as compared to the repeating ground track in FIG. 4) is that the number of loops in the satellite strings X2 and Y2 can vary while still maintaining drift lock DL between the first and second satellite strings X2 and Y2. For example, in the illustrate embodiment of FIG. 4 above, both satellite strings X1 and Y1 have similar altitudes close to 1150 km and both satellite systems X1 and Y1 run 13 loops until the satellite strings X1 and Y1 repeat their ground track. In contrast, in the illustrated embodiment of FIG. 5, both satellite strings X2 and Y2 have similar altitudes close to 1150 km and both satellite systems X2 and Y2 run 7 loops, establishing a synchronized, but non-repeating ground track.

Because the satellite systems X2 and Y2 in FIG. 5 are synchronized to drift at the same rate with drift lock DL, the satellite coverage of the satellite system X2 and Y2 remains meshed or interleaved. As described above, meshing or interleaving between satellite strings is desirable in communication systems that depend on a known satellite constellation for predictable satellite coverage.

Figure 6:
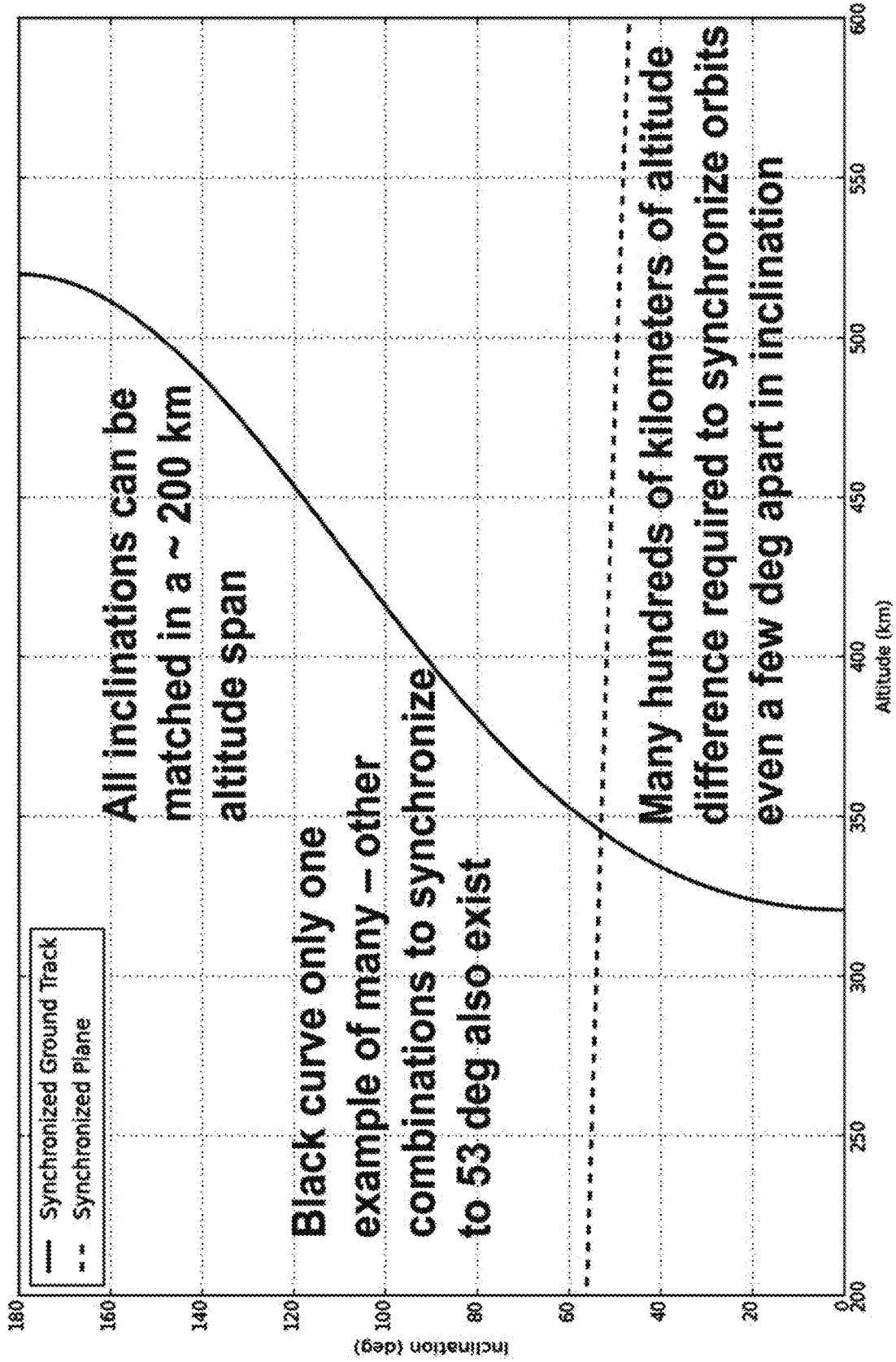
FIG. 6 is a graph showing how altitude varies to maintain a fixed drift between a second satellite system having a different inclination in a synchronized ground track or a synchronized planar orbit in accordance with embodiments of the present disclosure.

Altitude Difference Needed for Synchronized Planes Versus Synchronized Ground Tracks Referring to FIG. 6, a graph showing how altitude varies to maintain a fixed drift between a second satellite system having a different inclination in a synchronized ground track or in a synchronized planar orbit. The graph of FIG. 6 plots altitude (in km) versus inclination (in degrees). The orbit that is being synchronized in the graph for fixed drift is arbitrarily set at about 345 km altitude and 53 degree inclination.

The dotted line in FIG. 6 shows that many hundreds of kilometers of altitude difference are required to synchronize planar orbits even a few degrees apart in inclination.

The solid line in FIG. 6 shows that all inclinations from 0 to 180 degrees for synchronized ground tracks can be matching in an altitude span of about 200 km. Therefore, synchronized (fixed drift) ground tracks can be achieved within a small altitude span of about 200 km, for example, a small altitude span within a single government-licensed altitude band for orbiting satellite spacecraft.

Stagger for Satellites in a String

Figure 7A:
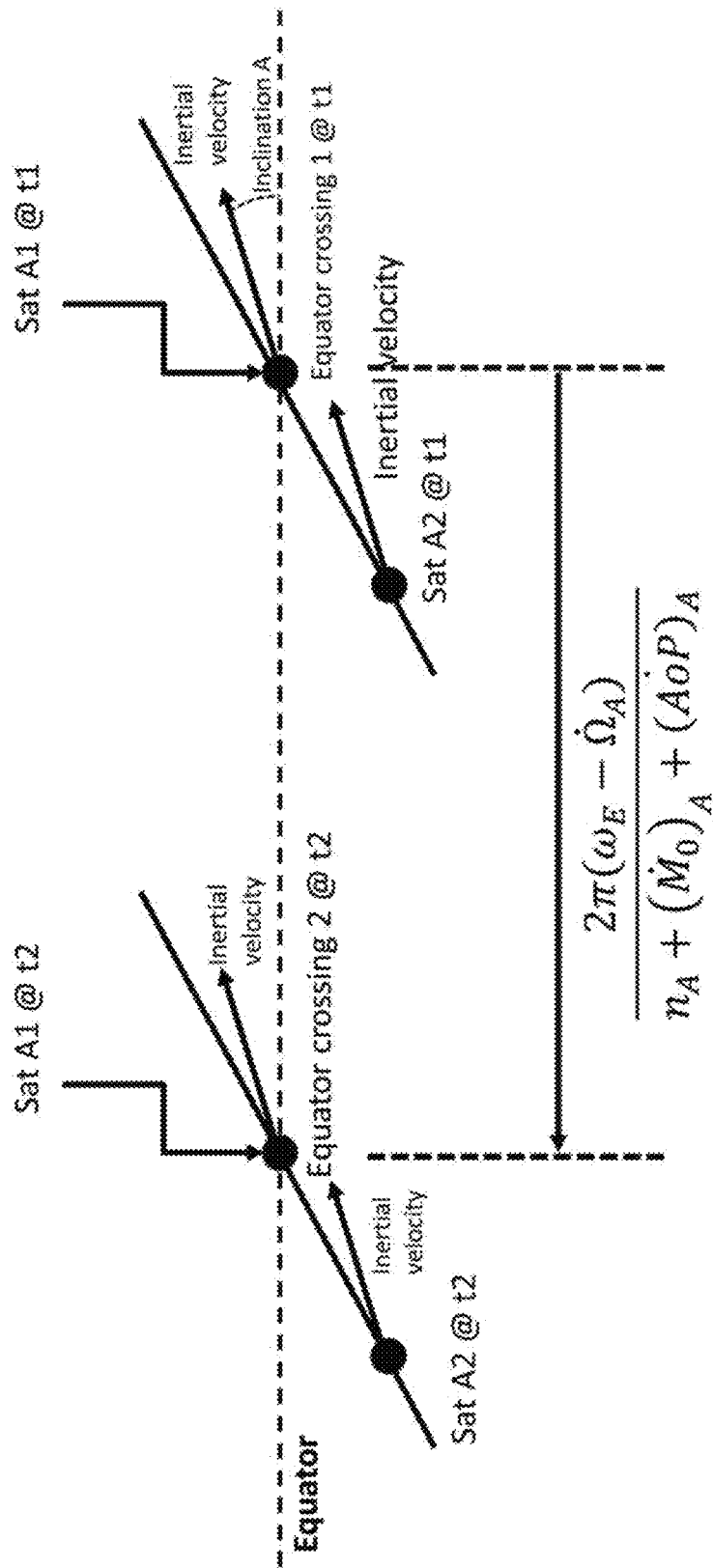
FIGS. 7A and 7B are close-up schematic views of equator crossings by individual satellites in satellite strings in accordance with embodiments of the present disclosure are provided.
Figure 7B:
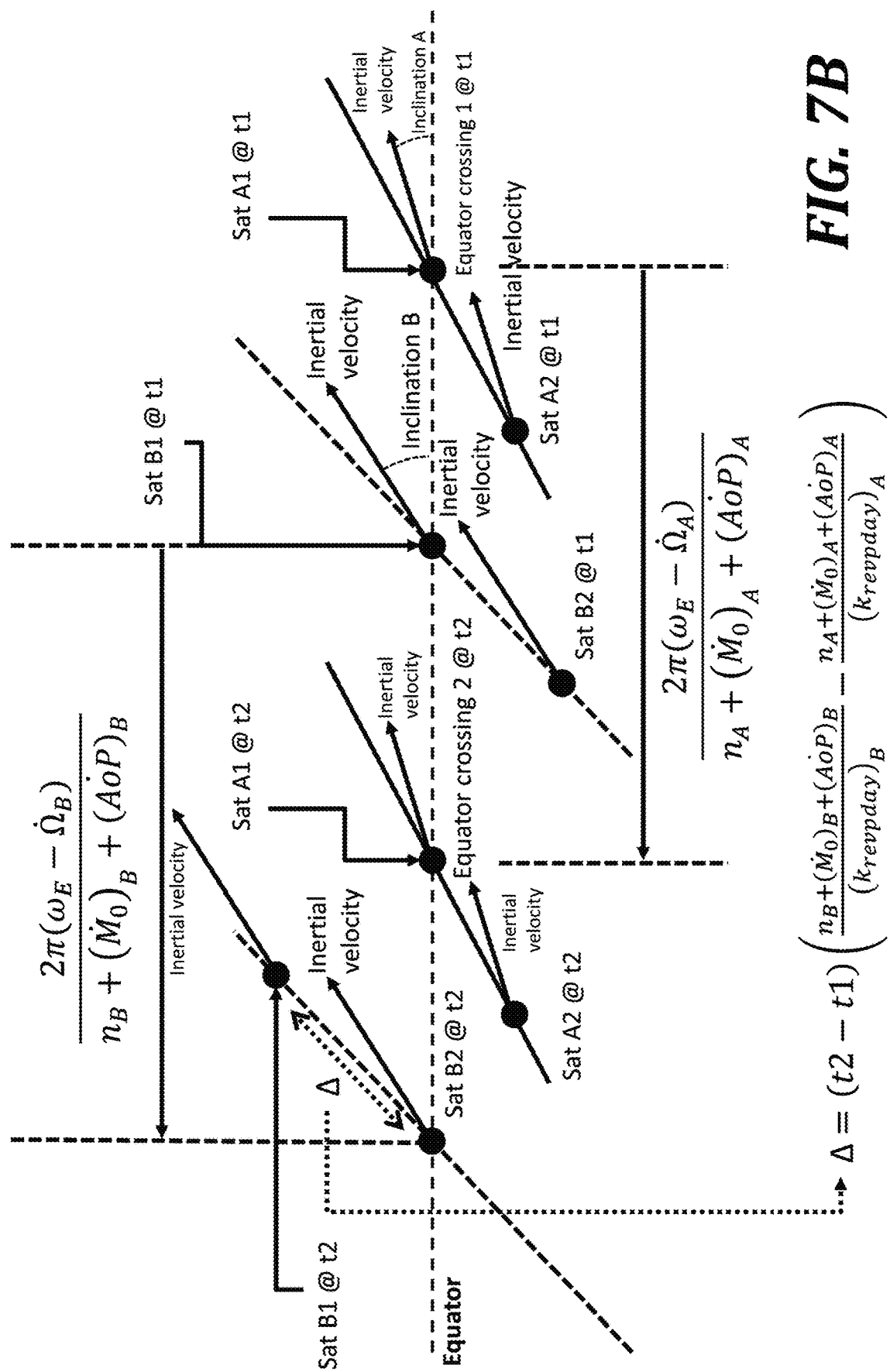

Referring to FIGS. 7A and 7B, close-up views of equator crossings by individual satellites in a satellite string in accordance with one embodiment of the present disclosure are provided. In FIG. 7A, one satellite string A is shown at inclination A. In FIG. 7B, two satellite strings A and B are shown at inclinations A and B.

Referring to FIG. 7A, satellite string A includes first and second adjacent satellites A1 and A2 in adjacent orbits (see, e.g., adjacent orbits in FIG. 3A) having adjacent RAAN in accordance with embodiments of the present disclosure. Although satellites A1 and A2 are in adjacent orbits and have adjacent RAAN, they have the same inclination α.

At a first time t1, satellite A1 crosses the equator at an ascending node (from the southern hemisphere to the northern hemisphere), and satellite A2 is nearing the equator. At a second time t2, satellite A1 again crosses the equator at an ascending node (from the southern hemisphere to the northern hemisphere), completing a loop around the Earth, and satellite A2 is again nearing the equator, also completing a loop around the Earth.

The longitudinal distance along the equator between adjacent ascending nodes of the same satellite A1 across the equator (from the southern hemisphere to the northern hemisphere) is calculated by the following equation:

$$\frac{2\pi(\omega_E - \dot{\Omega}_A)}{n_A + (\dot{M}_0)_A + (A\dot{o}P)_A}$$

The stagger between adjacent satellites A1 and A2 in the same satellite string A is the ratio between the difference in RANN between adjacent satellites A1 and A2 divided by the difference in argument of latitude between adjacent satellites A1 and A2.

Stagger=ΔΩ/Δ(ν+ω)

In the above equation for stagger, $\dot{\Omega}$ is RAAN, ν is true anomaly, and ω is argument of periapsis. Argument of latitude is equally to the sum of true anomaly and argument of periapsis.

Stagger is illustrated in FIG. 3A as the relationship between the change in RAAN ΔΩ and the change in relative argument of latitude Δ(ν+ω) between satellites in a wave satellite string W. The stagger value is the same whether the satellites are adjacent each other or distanced from each other in the wave satellite string W. With a consistent stagger value between satellites in the satellite string, the satellite string has a controllable regression rate or drift rate.

If the satellite string A is a repeating ground track system, then the drift of the satellite string A is designed to match the Earth's rotation rate, as designed by the number of loops in the path of the satellite string A for the specific altitude of the satellite string. In a repeating ground track system in accordance with embodiments of the present disclosure, RAAN repeats after a predetermined number of loops in the satellite path.

If the satellite string A is a non-repeating ground track system, then the drift of the satellite string A may vary from the Earth's rotation rate, as designed by the number of loops in the path of the satellite string A for the specific altitude of the satellite string. In a synchronized constellation of two satellite strings, RAAN precession is in drift lock.

Referring to FIG. 7B, satellite string A includes first and second adjacent satellites A1 and A2 in adjacent orbits having adjacent RAAN, and at the same inclination α.

In addition, satellite string B includes first and second adjacent satellites B1 and B2 in adjacent orbits having adjacent RAAN, and at the same inclination β (which is different from inclination α of satellite string A).

At a first time t1, satellite A1 at inclination a crosses the equator at an ascending node (from the southern hemisphere to the northern hemisphere), and satellite A2 also at inclination α is nearing the equator. At the same time t1, satellite B1 at inclination β crosses the equator at an ascending node (from the southern hemisphere to the northern hemisphere), and satellite B2 also at inclination β is nearing the equator.

At a second time t2, satellite A1 at inclination α again crosses the equator at an ascending node (from the southern hemisphere to the northern hemisphere), and satellite A2 also at inclination α is again nearing the equator. At the same time t2, satellite B1 at inclination β again crosses the equator at an ascending node (from the southern hemisphere to the northern hemisphere), and satellite B2 also at inclination β is again nearing the equator.

The distance along the equator between adjacent crossings of same satellite B1 across the equator between nodes (from the southern hemisphere to the northern hemisphere) is calculated by the following equation:

$$\frac{2\pi(\omega_E - \dot{\Omega}_B)}{n_B + (\dot{M}_0)_B + (A\dot{o}P)_B}$$

The relative argument of latitude drift A between A1 and B1 after A1 had done exactly one loop is calculated by the following equation:

$$\Delta = (t2 - t1)\left(\frac{n_B + (\dot{M}_0)_B + (A\dot{o}P)_B}{(k_{revpday})_B} - \frac{n_A + (\dot{M}_0)_A + (A\dot{o}P)_A}{(k_{revpday})_A}\right)$$

Referring to FIG. 8, the longitude of the ascending node (LAN) is measured relative to the Prime Meridian (Greenwich Line), which in the geographic coordinate system at which longitude is defined to be 0° dividing the Earth into the Eastern Hemisphere and the Western Hemisphere.

Like in FIG. 7B, the satellite string A in FIG. 8 includes first and second adjacent satellites A1 and A2 in adjacent orbits and at the same inclination α. In addition, satellite string B includes first and second adjacent satellites B1 and B2 in adjacent orbits and at the same inclination β (which is different from inclination α of satellite string A). LAN A1 and LAN A2 values and LAN B1 and LAN B2 values are shown.

DESCRIPTION OF CLAIMED EMBODIMENTS

Embodiments of the present disclosure are directed to constellations of satellites having synchronized ground tracks, in contrast to the traditional method of "synchronized planes". In accordance with one embodiment of the present disclosure, constellations of satellites having synchronized ground tracks orbit the Earth in "snake", "string", or "ground track" configurations instead of following each other in orbital planes.

In a snake, the constellation of satellites includes a first plurality of satellites at a first inclination, with each of the first plurality of satellites in a different planar orbit. The snake of satellites includes adjacent satellites in adjacent orbits having adjacent RAAN (Right Ascension of the Ascending Node).

By selective placement of adjacent satellites in relative argument of latitude and RAAN, the "virtual ascending node" of the constellation snake has a controllable regression rate.

In embodiments of the present disclosure, the stagger between satellites in the first snake of satellites is substantially constant.

In embodiments of the present disclosure, the snake defines a plurality of loops forming a continuous path.

If a snake/ground track has N equatorial crossings before repeating, then the location of those crossings can be identified on a map with N longitudes of the ascending node. Arbitrarily picking any of these crossings as Crossing 1, and setting its longitude of the ascending node as the "virtual ascending node" of the snake/ground track, we can identify the orientation of the complete snake/ground track by this single "virtual ascending node". This virtual ascending node can either be fixed for all time (=a repeat ground track orbit), or it can drift east/west over time (=a drifting ground track). Whether it is fixed, or whether it drifts and at what rate, can be controlled through careful specification of the exact orbital parameters (semi-major axis, inclination, and eccentricity) of the snake/ground track.

In another embodiment of the present disclosure, the constellation of satellites includes a second plurality of satellites orbiting at a second inclination, wherein the second inclination is different from the first inclination. The satellites of the second plurality of satellites are each in a different planar orbit to form a second snake of satellites. The second snake of satellites includes adjacent satellites in adjacent orbits having adjacent RAAN.

In embodiments of the present disclosure, the stagger between satellites in the second snake of satellites is substantially constant.

In accordance with embodiments of the present disclosure, the first and second snakes have a synchronized virtual RAAN rate such that their ascending nodes maintain constant spacing.

In one embodiment, the first and second snakes provide fixed and interleaved ground coverage at the equator. In another embodiment, the first and second snakes provide fixed and overlapping ground coverage at the equator.

For suitable applications, such as satellite global internet coverage, the first inclination may be in range selected from the group consisting of between 30 degrees and 60 degrees and between 40 degrees and 55 degrees. Likewise, the second inclination may be in a range selected from the group consisting of between 30 degrees and 60 degrees and between 40 degrees and 55 degrees. However, other inclination ranges are within the scope of the present disclosure, with inclination depending on the technical application for the satellite constellation.

In embodiments of the present disclosure, the RAAN rate of the snakes is controllable. The first and second snakes may be in repeating ground tracks or in drifting ground tracks.

In one embodiment of the present disclosure, the satellites in the first or second plurality of satellites may be located at an altitude range in space selected from the group consisting of between 300 km and 400 km and between 330 km and 350 km from Earth. Constellations of satellites having synchronized ground tracks may be located in other altitude ranges depending on the technical application for the satellite constellation.

In one embodiment, the satellites in the first snake and the satellites in the second snake may be within an altitude of each other in a range of less than or equal to 200 km.

In another embodiment of the present disclosure, the satellite constellation may include a third plurality of satellites traveling at a third inclination. The third inclination is different from the first and second inclinations. The satellites of the third plurality of satellites are each in a different planar orbit to form a third snake of satellites, the third snake of satellites including adjacent satellites in adjacent orbits having adjacent RAAN.

In accordance with embodiments of the present disclosure, the satellite constellation may include any number of pluralities of satellites in different applications, depending on the technical application for the satellite constellation.

Example 1

One Inclination, One Ground Track

Figure 9:
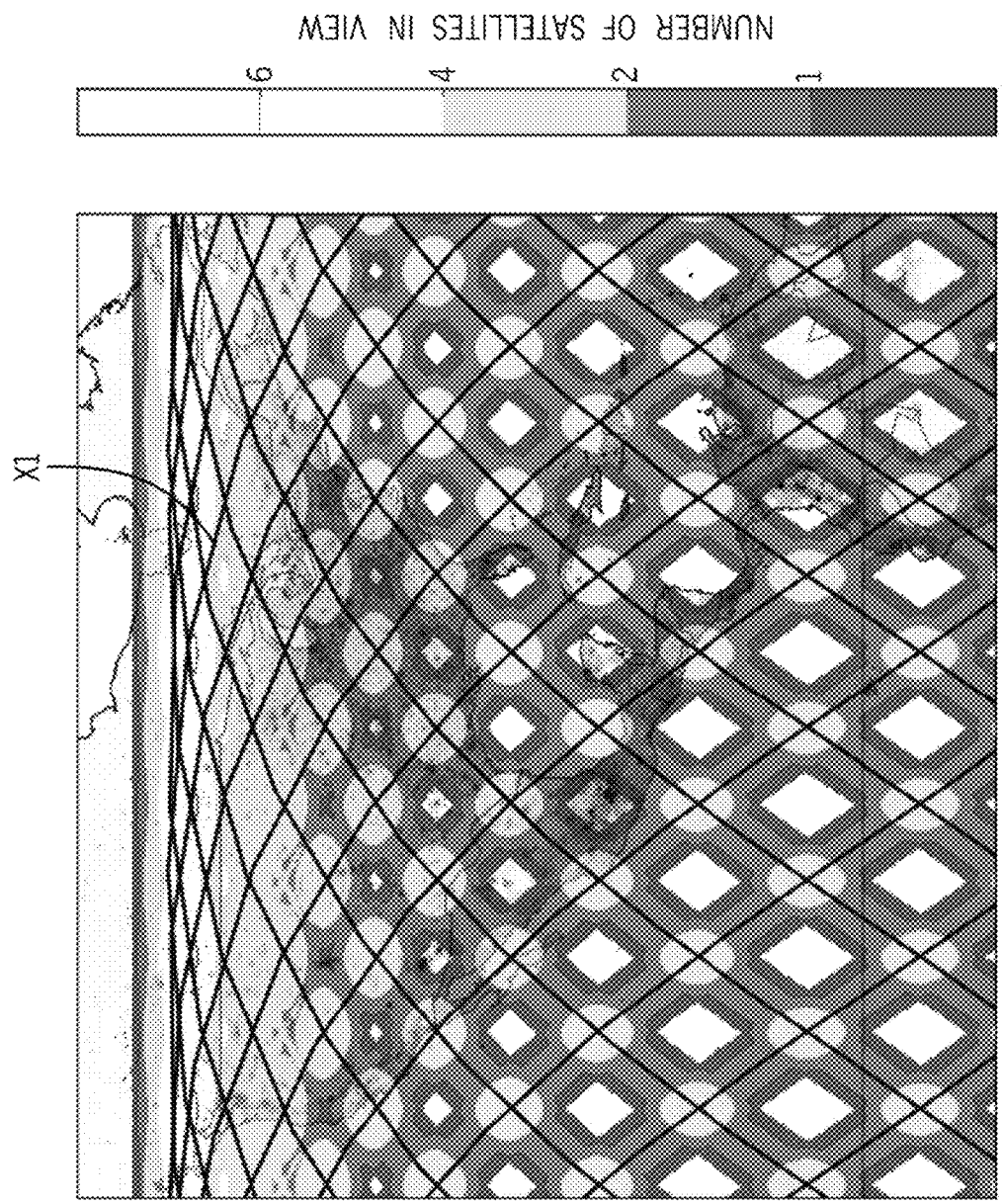
FIGS. 9-11 are directed to examples of ground coverage for various satellite constellations in accordance with embodiments of the present disclosure.

Referring to FIG. 9, an exemplary contour plot of satellite communication coverage is provided. The contour plot shows the mean number of satellites in view. The ground track is a repeating ground track with 31 satellite revolutions every 2 days. The number of satellites is 2549 at altitude 345.6 km. The inclination of the satellite string X1 is at 53.0. The spacecraft antenna nadir angle is 40.5 degrees, and the user terminal minimum elevation angle is 46.8 degrees.

The lines of the contour plot show the ground track of the satellites in the satellite string X1. The ground tracks may be repeating or non-repeating (i.e., moving slowly across the surface of the Earth, either East or West). The contour plot shows communication coverage increases where the ground tracks cross. The contour plot shows no communication coverage at a certain distance from the ground tracks.

Example 2

Two Inclinations, Two Ground Tracks

Figure 10:
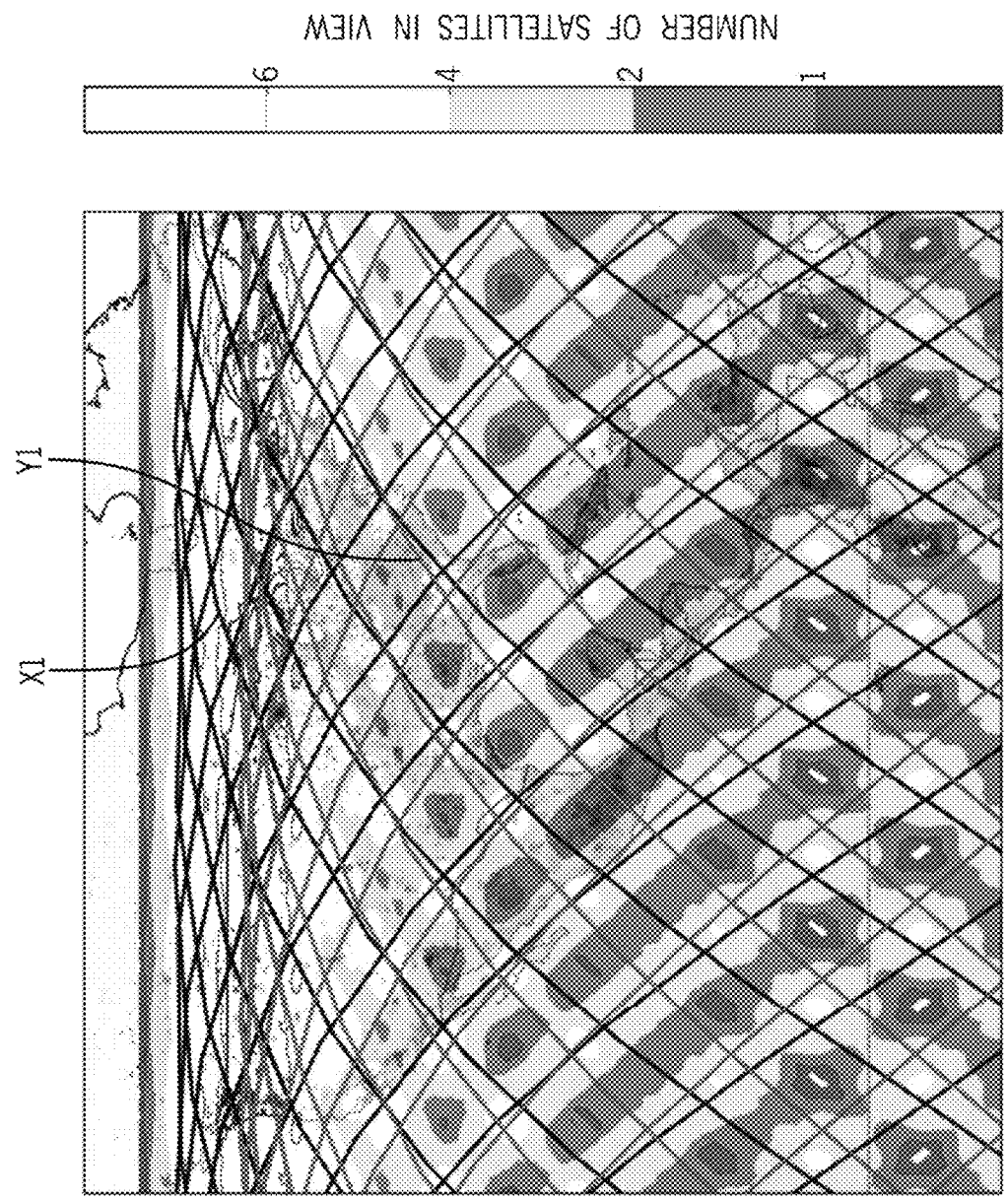

Referring to FIG. 10, an exemplary contour plot of satellite communication coverage is provided. The contour plot shows the mean number of satellites in view. The first and second ground tracks each include 31 satellite revolutions every 2 days. The number of satellites in the two ground tracks is 5026 at altitudes 345.6 and 340.8. The inclinations of the satellite strings X1 and Y1 are at 53.0 and 48.0. The spacecraft antenna nadir angle is 40.5 degrees, and the user terminal minimum elevation angle is 46.8 degrees.

The lines of the contour plot show the first and second ground tracks of the satellites in the satellite strings X1 and Y1. The ground tracks may be repeating or non-repeating (i.e., moving slowly across the surface of the Earth, either East or West). The contour plot shows communication coverage increases compared to the communication coverage in EXAMPLE 1 as a result of the addition of the second ground track at a second inclination.

Example 3

Three Inclinations, Three Ground Tracks

Figure 11:
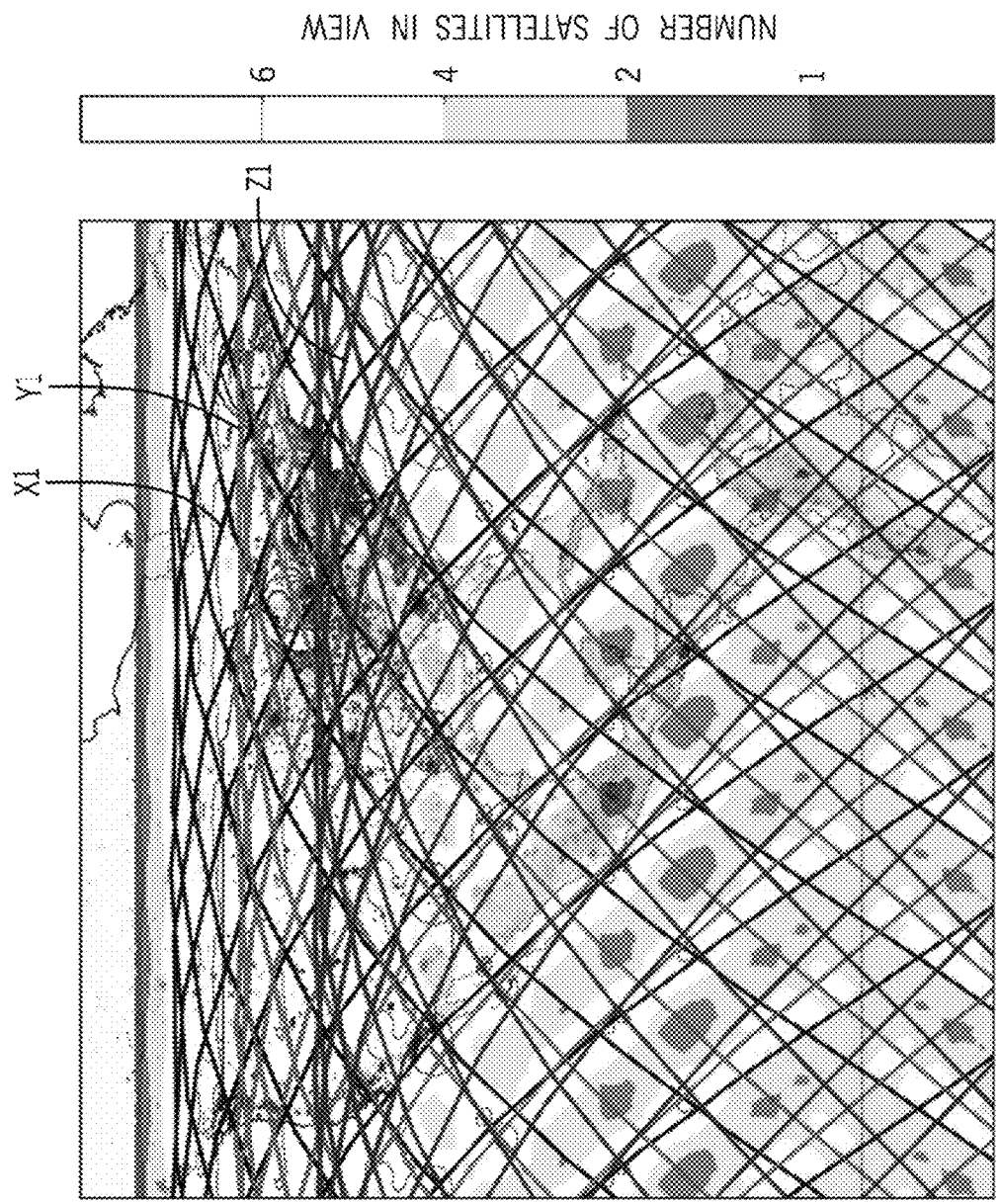

Referring to FIG. 11, an exemplary contour plot of satellite communication coverage is provided. The contour plot shows the mean number of satellites in view. The first, second, and third ground tracks each include 31 satellite revolutions every 2 days. The number of satellites in the three ground tracks is 7518 at altitudes 345.6, 340.8, and 335.9 kms. The inclinations of the satellite strings X1, Y1, and Z1 are at 53.0, 48.0, and 42.0 degrees. The spacecraft antenna nadir angle is 40.5 degrees, and the user terminal minimum elevation angle is 46.8 degrees.

The lines of the contour plot show the first, second, and third ground tracks of the satellites in the satellite strings X1, Y1, and Z1. The ground tracks may be repeating or non-repeating (i.e., moving slowly across the surface of the Earth, either East or West). The contour plot shows significantly increased communication coverage increases compared to the communication coverage in EXAMPLES 1 and 2 as a result of the addition of the third ground track at a third inclination.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A method of communication with a non-GEO constellation of satellites, comprising:
   providing an Earth-based terminal configured for communication with a satellite constellation; and
   establishing communication between the Earth-based terminal and a non-GEO constellation of satellites, the non-GEO constellation of satellites including a first plurality of satellites orbiting at a first inclination, wherein each of the satellites in the first plurality of satellites is in a discrete planar orbit to form a first snake of satellites, the first snake of satellites including adjacent satellites in adjacent orbits having adjacent RAAN (Right Ascension of the Ascending Node), wherein the Earth-based terminal is positioned and configured for continuous communication with at least one satellite from the non-GEO constellation of satellites.

2. The method of claim 1, wherein by selective placement of adjacent satellites in relative argument of latitude and RAAN, the virtual ascending node of the constellation snake has a controllable regression rate.

3. The method of claim 1, wherein the stagger between satellites in the first snake of satellites is substantially constant.

4. The method of claim 1, wherein the snake defines a plurality of loops forming a continuous path.

5. The method of claim 1, further comprising a second plurality of satellites orbiting at a second inclination, wherein the second inclination is different from the first inclination, wherein each of the satellites in the second plurality of satellites is in a different planar orbit to form a second snake of satellites, the second snake of satellites including adjacent satellites in adjacent orbits having adjacent RAAN.

6. The method of claim 5, wherein the stagger between satellites in the second snake of satellites is substantially constant.

7. The method of claim 5, wherein the first and second snakes have a synchronized virtual RAAN rate such that their ascending nodes maintain constant spacing.

8. The method of claim 5, wherein the first and second snakes provide fixed and interleaved ground coverage at the equator.

9. The method of claim 5, wherein the first and second snakes provide fixed and overlapping ground coverage at the equator.

10. The method of claim 1, wherein the first inclination is in a range selected from the group consisting of between 30 degrees and 60 degrees and between 40 degrees and 55 degrees.

11. The method of claim 5, wherein the second inclination is in a range selected from the group consisting of between 30 degrees and 60 degrees and between 40 degrees and 55 degrees.

12. The method of claim 1, wherein the first snake is a first repeating ground track.

13. The method of claim 5, wherein the second snake is a second repeating ground track.

14. The method of claim 1, wherein the first snake is a first drifting ground track.

15. The method of claim 5, wherein the second snake is a second drifting ground track.

16. The method of claim 5, wherein the satellites in the first snake and the satellites in the second snake are within an altitude of each other in a range of less than or equal to 200 km.

17. The method of claim 5, further comprising a third plurality of satellites traveling at a third inclination, wherein the third inclination is different from the first inclination and a second inclination of a second plurality of satellites, wherein each of the satellites in the third plurality of satellites is in a different planar orbit to form a third snake of satellites, the third snake of satellites including adjacent satellites in adjacent orbits having adjacent RAAN.

18. A method of communication with a non-GEO constellation of satellites, comprising:
   providing an Earth-based terminal configured for communication with a satellite constellation; and
   establishing communication between the Earth-based terminal and a first plurality of satellites orbiting at a first inclination, wherein each of the satellites in the first plurality of satellites is in a discrete planar orbit to form a first snake of satellites, the first snake of satellites including adjacent satellites in adjacent orbits having adjacent RAAN (Right Ascension of the Ascending Node), wherein the stagger between satellites in the first snake of satellites is substantially constant, and establishing communication between the Earth-based terminal and a second plurality of satellites orbiting at a second inclination, wherein the second inclination is different from the first inclination, wherein each of the satellites in the second plurality of satellites is in a different planar orbit to form a second snake of satellites, the second snake of satellites including adjacent satellites in adjacent orbits having adjacent RAAN, wherein the stagger between satellites in the second snake of satellites is substantially constant.

* * * * *